United States Patent
Halladay

(10) Patent No.: US 7,220,487 B2
(45) Date of Patent: May 22, 2007

(54) AMBIENT CURED FLEXIBLE FLUOROELASTOMER COATINGS AND COATED PRODUCTS

(75) Inventor: James R. Halladay, Harborcreek, PA (US)

(73) Assignee: Lord Corporation, Cary, NC (US)

( * ) Notice: Subject to any disclaimer, the term of this patent is extended or adjusted under 35 U.S.C. 154(b) by 237 days.

(21) Appl. No.: 11/037,678

(22) Filed: Jan. 18, 2005

(65) Prior Publication Data

US 2005/0153138 A1 Jul. 14, 2005

Related U.S. Application Data

(63) Continuation-in-part of application No. 10/205,178, filed on Jul. 25, 2002, now Pat. No. 6,844,412.

(51) Int. Cl.
*B32B 27/00* (2006.01)

(52) U.S. Cl. ............ 428/421; 428/422; 525/100; 525/102; 525/104; 526/242; 526/245; 526/250; 526/253; 526/254; 526/255; 528/26; 528/38

(58) Field of Classification Search ............ None
See application file for complete search history.

(56) References Cited

U.S. PATENT DOCUMENTS

| | | | | | |
|---|---|---|---|---|---|
| 5,395,886 | A | * | 3/1995 | Caporiccio et al. | 525/102 |
| 5,498,657 | A | * | 3/1996 | Sugiyama et al. | 524/463 |
| 5,604,283 | A | * | 2/1997 | Wada et al. | 524/236 |
| 2003/0157336 | A1 | * | 8/2003 | Kinoshita et al. | 428/421 |
| 2006/0052558 | A1 | * | 3/2006 | Morikawa et al. | 526/247 |

FOREIGN PATENT DOCUMENTS

| JP | 3-287615 | * | 12/1991 |
|---|---|---|---|
| JP | 8-209102 | * | 8/1996 |

* cited by examiner

*Primary Examiner*—Marc S. Zimmer
(74) *Attorney, Agent, or Firm*—Todd W. Galinski

(57) ABSTRACT

The present invention provides an ambient temperature curable fluoroelastomer coatings and coated articles to provide improved elongation, and adhesion to substrates especially flexible elastomeric substrates. The curable coating mixture is a mixture of two parts, part A containing a solution of a fluoroelastomer containing a specified acid number, and the other part B providing a curing component which is a mono-primary amine containing silane or condensate.

11 Claims, No Drawings

US 7,220,487 B2

AMBIENT CURED FLEXIBLE FLUOROELASTOMER COATINGS AND COATED PRODUCTS

RELATION-BACK STATEMENT

This application is a Continuation-In-Part of Application of Ser. No. 10,205,178, filed Jul. 25, 2002 now U.S. Pat. No. 6,844,412.

FIELD OF INVENTION

The present invention is directed to organic solution coatings which are ambient temperature curable and capable of being brushed, dipped or spray-applied to conventional substrates such as rubbery elastomeric seals, rings, moldings, housings, rubber-metal composites and flexible-to-rigid thermoplastic substrates. The coatings provide enhanced appearance, resistance to solvents and fuels, and enhanced ozone resistance for the underlying elastomer substrate. The coatings are highly extensible by providing flexible crosslinks as defined hereinbelow. The coatings are especially useful to coat molded rubber goods, such as pneumatic or non-pneumatic wheels and tires, hoses, belts, rubber bonded metallic mounts, and the like, especially where used near hot bodies, such as engine blocks coming into contact with fuels and oils.

BACKGROUND OF THE INVENTION

There is a well-known difficulty in obtaining good adhesion between elastomeric coatings based on polar elastomers and non-polar rubber substrates. Useful elastomeric coatings have been made from such polar elastomers as carboxylated hydrogenated nitrile rubber (XHNBR) or ethylene acrylic terpolymers (AEM) in co-pending U.S. Pat. No. 6,884,412.

Common examples of nonpolar elastomers as substrates include as natural rubber (NR), polyisoprene (IR), polybutadiene (BR), styrene butadiene (SBR) and ethylene propylene (EPDM). One known method used to improve adhesion to a nonpolar elastomer substrate has been to treat the substrate with a chlorinating or oxidizing acid such as trichloroisocyanuric acid. This treatment is undesirable in many applications because the acid residue can cause corrosion to the spray equipment, dip tanks, and exhaust systems in the application lines and there is the suspicion that it may initiate corrosion of rubber to metal bonded parts that have been treated prior to coating.

Heretofore, commercial primers such as Chemlok® 254X have been used to enhance adhesion to EPDM, but is of limited use in preparing NR, BR SBR, and blends thereof for adhesion of polar overcoatings. Such nonpolar elastomers are most commonly used in dynamic applications ranging from tires to vibration isolators and dampers. Additional primers having ease of use and less corrosive are needed.

Conventional fluoroelastomers as coatings suffer from poor adhesion to many substrates and insufficient elongation when coated over flexible elastomers. Existing commercial fluoropolymer coatings delaminate and stress crack after limited flex-testing. Improved fluoroelastomer coatings are sought that provide curing in several hours and sufficient pot life to enable brushing, dipping and spray applications, and provide functional coatings on a variety of flexible elastomers, especially nonpolar elastomers.

SUMMARY OF THE INVENTION

The present invention provides a mixture of two parts, one part containing a fluoroelastomer and the other part containing a coatings and coated articles therefrom that provide surprising substrate adhesion, improved elongation, and weatherability for a variety of purposes. In one embodiment a fluoroelastomer coating composition.

In another embodiment, a primer-coat-top-coat system is provided, where the first coating is a primer comprising a functionalized film-forming primer. Preferred primers coating compositions are highly saturated polymers reactive with organosilanes, and exhibiting a Tg of less than 0° C. Highly saturated means a level of from 0 to 20% unsaturation. The preferred curable primer polymer is mixed with from 25 to 150 parts by weight per one hundred parts by weight of priming polymer, of a silane compound, oligomer, or polymer containing silicone bonded groups coreactive with the functional group on the primer polymer in the presence of moisture.

The room temperature curable coating mixture comprises a solution of fluoroelastomer in solvent. The fluoroelastomer contains an acidic cure site such that the measured acid number is from 2 to 6 mg base per gram of fluoroelastomer, and preferably from 3 to 5 mg base per gram of fluoroelastomer. The curing component is a mono-primary aminosilane compound, oligomer or polymer, and present at an equivalent ratio of amine: acid cure site of from 3:1 to 12:1. The mixed parts of polymer and curing component provide a pot-life of from 1 hour to several hours depending on the reactivity of the selected curing components. The curable film former and curing component are mixed together at an overall 4% to 25% solids content. The viscosity can vary depending on the selected components and is typically less than 20,000 cps (Brookfield LVF) at solids levels of around 10 wt. %. The coating can be sprayed, brushed or dipped at these viscosities and allowed to dry to form dry films ranging in thickness (DFT) of from 0.001 to about 0.020 in. (0.025-0.51 mm). Typically, multiple layers are applied when higher DFT is desired.

More specifically, the fluoroelastomer coating composition of the invention comprises a dilute, sprayable coating containing typically about 4 wt. % to 25 wt. % dissolved fluoroelastomer solids in an organic solvent, in the substantial absence (<100 ppm) of water and less than 1000 ppm of free isocyanate groups. No transition metal catalysts, or metal oxides are used. The primary aminosilane chemically bonds via the primary amine to cure sites on the fluoroelastomer and the alkoxysilane group(s) bond to other alkoxysilane groups bound through another primary amine at another cure site on the fluoroelastomer when exposed to ambient moisture.

In another aspect, the fluoroelastomer coating compositions are applied over previously applied primer polymers. The most preferred primer polymers are coatings containing functionalized hydrogenated nitrile rubber, or carboxy-modified ethylene copolymers.

In another embodiment, there is provided a coated elastomer substrate having two sides such as a molded elastomeric cover, wherein on a side which is to be exposed to fuels, oils, solvents and the like, this side contains a thin coating of the fluoroelastomer as a protective layer on the elastomer. In the case of seals or gaskets, where one side is intended to be exposed to a chemical environment different than the other side, one side of the seal is coated with or formed from a hydrogenated polybutadiane, or other highly saturated non-fluorinated polymer and the other side is coated to contain an outer layer of the fluoroelastomer coating composition according to the present invention. In yet another embodiment, the entire seal is made from an elastomer other than HNBR, and is coated entirely with a HNBR primer coating disclosed herein, and one side is further coated with a second coating of fluoroelastomer according to the present invention.

In another specific embodiment, particulate metal-filled emissive elastomeric coatings are provided which are devoid of vulcanization chemicals, e.g., peroxides, and accelerators, which are room temperature curable, without heat. These provide durable, weatherable, long-term flexible films tightly adhered to the substrate and provide heat dissipation when applied to flexible polymeric substrates, especially vulcanized rubber articles.

DETAILED DESCRIPTION OF THE PREFERRED EMBODIMENTS

The fluoroelastomers used herein are hydrophobic. By hydrophobic is meant that at least 80% of the fluoroelastomer is derived from water insoluble monomers.

The class of solvent-soluble fluoroelastomers disclosed herein have been found to cure to elastomer substrates at ambient temperatures and provide at least 200% elongation after curing. Such elongation surprisingly overcomes the limitations in flex-cracking exhibited by conventional fluoroelastomer coatings. The curing of the fluoroelastomer according to the present invention provides flexible crosslinks, having at least 8 intervening atoms linked in a chain between different cure sites on the fluoroelastomer. Such a flexible crosslink provides surprising long-term flexing capability, tensile and elongation properties.

Representative of fluoroelastomers containing acidic cure sites include carboxylated fluoroelastomers. These materials are believed to cure with the curing component by formation of bonds between carboxyl groups and mono-primary amino group on the aminosilane in anhydrous conditions. Salt forming reactions are believed to be supplemented by condensation reactions between two salt-bridged curing components and/or to the acidic polymer cure sites. The surprising enhanced tensile strength and elongation properties are believed to occur by the formation of flexible crosslinkages containing at least 8 interchain atoms.

The interaction between curing component and functional groups on the carboxylated fluoroelastomer polymer include electrophile-nucleophile interactions. Acidic cure sites, e.g., carboxyl cure sites on the fluoroelastomer can be provided by copolymerization of a comonomer bearing a carboxylic acid group or by various known methods for modifying fluoroelastomers by incorporation of acidic functional groups onto the polymer after polymerization.

The term "functionalized" generally applied to film forming polymers, particularly fluoroelastomers, means (1) that an electrophile, nucleophile, especially an active hydrogen-bearing moiety is part of an ethylenic unsaturated comonomer that is copolymerized, or (2) an electrophile, nucleophile and especially an acidic hydrogen bearing compound is part of a graftlinking compound graft-linked to a base fluoroelastomer, or film former after- or post-polymerization. The discussion below particularly applies to fluoroelastomers, but is equally applicable to primer polymers useful in the invention as primers under the fluoroelastomer coatings.

The fluoroelastomer cure site can be a comonomer or grafted compound that becomes ionically and/or covalently bonded to the polymer structure, and provides a pendant group capable of reacting with a curing component at ambient temperatures. Terminal functional groups can be present, although it is critical that sufficient pendant cure sites are formed or present, such that the fluoroelastomer exhibits an acid number of from 2 to 6 mg base per gram of fluoroelastomer.

Incorporation of an acidic hydrogen-bearing functional group or a co-reactive group therewith into a non-functional fluoroelastomer is provided by converting a functional group-bearing compound into a suitable functional group precursor or by the direct incorporation of a suitable precursor radical when the fluoroelastomer is forming, is formed and in solution or is formed and in the molten state. A representative known post-polymer method includes the "Ene" reaction, whereby an allylic hydrogen transfers to an enophile followed by coupling between two unsaturated termini, or via free-radical addition across a dehydrohalogenated repeating unit in solution or in the heated molten state.

When the fluoroelastomer is in the molten state, however, means capable of imparting high mechanical shear as are known, such as an extruder, or mill will be used to effect the desired reaction to incorporate the functional group or directly incorporate a suitable precursor radical. When the functional group to be converted to a suitable precursor or the precursor radical is incorporated via techniques such as metallation followed by reaction with a suitable electrophile, on the other hand, incorporation of cure site compounds will, preferably, be accomplished with the polymer in solution.

A variety of post-polymerization functionalization techniques are known which provide heretofore non-functional addition polymers with nucleophilic, or electrophilic crosslinking cure sites for use in the present invention. Hydroxyl groups are useful functional groups for effecting the crosslinking reactions with curing components used herein. U.S. Pat. No. 4,118,427 discloses hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents such as diisobutyl aluminum hydride, to form the hydroxyl-containing polymer.

A partial listing of nucleophilic and/or acidic hydrogen functional groups that can be incorporated on the fluoroelastomer and coreactive with electrophilic group-substituted curing components or hydrolyzable curing agents are, hydroxy-mercapto-, isocyanato-, amino-, phenolic-, and carboxyl-groups. Exemplary electrophilic groups incorporated on the fluoroelastomer and coreactive with nucleophilic group-substituted curing components are alkyl halide-, benzyl halide-, allyl halide-, ester-, ethers-, anhydride-groups, and the like. When the fluoroelastomer contains a pendant nucleophilic group, the corresponding group provided on at least one valency of the silicone atom of the silane curing component can also include an alkoxy-, hydroxy-, mercapto-, isocyanato-, amino-, phenolic-, glycido-, carboxyl-, oxirane-, benzyl halide-, allyl halide-, alkyl halide-, ester-, ethers-, and/or anhydride-group.

A graft-functionalized fluoroelastomer embodiment film former utilized herein is the reaction product of a fluoroelastomer polymer and a grafting agent which contains a graft linking group which covalently bonds to the fluoroelastomer, and at least one active hydrogen-containing group, including but not limited to hydroxyl, thiol, or carboxyl groups that undergo bond formation to one of the reactive groups of the curing component. The graft-modified fluoroelastomer part A is combined with the curing component part B by simple admixture, and used within the expected pot life prior to gellation to coat the substrate.

The representative fluoroelastomers used herein include polymers derived from one or more fluorinated monomers. The preferred fluoroelastomers used herein are derived from such monomers as vinylidene fluoride, and hexafluoropropylene and are commercially available from a number of suppliers. Example fluoroelastomers result from combinations of two or more fluorinated monomers including 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The most preferred fluoroelastomer modified according to the invention are commercially available provided the acid number is from 2 to 6 mg base per gram of fluoroelastomer. Certain Viton® copolymers of vinylidenefluoride and hexafluoropropylene, or a terpolymer of vinylidenefluoride, tetrafluoroethylene, and hexafluoropropylene are believed to contain sufficient acid numbers so as to be suitable herein. Other suitable fluoroelastomers are available from Dyneon under the FLUOREL® mark, and from Ausimont under the TECHNIFLON® mark.

If the fluoroelastomer exhibits an acid number below about 2 mg KPH per gram of polymer, the coatings do not completely cure and do not develop sufficient tensile strength. If the ratio of equivalents of primary amine to equivalents of acid cure sites is less than about 3:1, the same incomplete curing and insufficient film toughness arises. If the acid number exceeds 6 mg base per gram of polymer, the film exhibits insufficient elongation, and flex-cracking is detrimentally affected. The mono primary aminosilane curing agent is critical. Secondary aminosilanes do not exhibit ambient temperature curing.

A copolymerizable comonomer is preferably a monocarboxylic, but can be polycarboxylic acid. Preferred carboxyl comonomers contain from 3 to about 8 carbon atoms. Examples of such preferred comonomers are acrylic acid, methacrylic acid, ethacrylic acid, β, β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like. The most preferred carboxyl comonomers are the monocarboxylic acid monomers such as acrylic acid, methacrylic acid, itaconic acid, and the like.

Poly(olefin/acrylic ester/carboxylate) copolymers useful as primer polymers herein are thermoplastic in the uncured state and are suitably flexible for use as part of the primer coating. These are principally copolymers produced by polymerizing at least one α-olefin with at least one $C_1$-$C_{18}$ alkyl (meth)acrylate and aminor amount of an unsaturated protic functional group-bearing comonomer that is accessible to form crosslinks with such materials as polyisocyanates, carbodiimides, and other curing agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an a-olefin-ester copolymer, e.g. by partial hydrolysis of pendant ester groups. Suitable a-olefins for polymerization of such olefin copolymer film-forming elastomers include ethylene, propylene, butene-1, isobutylene, pentenes, heptenes, octenes, and the like including combinations. $C_2$-$C_4$ α-olefins are preferred, and ethylene is most preferred.

The alkyl or alkoxy(meth)acrylate acids and esters are exemplary functionalized comonomers for incorporation into α-olefin primer polymers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy (meth)acrylates for copolymerizing with the α-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethyle-hexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the olefin monomers are: unsaturated carboxylic acids such as acrylic acid, methacrylic acid, itaconic acid and maleic acid and salts thereof, optionally in combination with alkyl esters of unsaturated carboxylic acids such as methyl acrylate and butyl acrylate.

Other comonomers which contain a functional acid, hydroxy, epoxy, isocyanate, amine, oxazoline, diene or other reactive functional group include the diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl (meth)acrylate and dihydrodicyclopentadienyloxyethyl (meth)acrylate.

A preferred olefin/acrylic ester copolymer useful as a primer polymer incorporates unsaturated carboxylic acid monomer units, such from (meth)acrylic acid or maleic acid, anhydride units, e.g. derived from maleic anhydride or partial ester units, e.g. mono ethyl maleate. In a preferred embodiment the polymer is a terpolymer of ethylene, $C_1$-$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below about 20° C. Ethylene-carboxylate copolymers are available commercially under the VAMAC® mark.

The primer polymers suitable for making a primer coating can be selected from various polymer blends, alloys, dynamically vulcanized polyolefins, composites of maleated addition polymers based on polyethylenes, such as maleated polypropylenes, maleated styrene-ethylene-butene-styrene-block copolymers, maleated styrene-butadiene-styrene block copolymers, maleated ethylene-propylene rubbers, and blends thereof can be utilized as the functionalized film-forming elastomer in accordance with the invention.

The most preferred functionalized film forming primer polymers, applied before the fluoroelastomer coating have a $T_g$ of less than 0° C. and are selected from carboxylated hydrogenated nitrile rubber and carboxy modified ethylene copolymers (sold under the tradename of Vamac® by DuPont).

The mono-primary aminofunctional silane curing agents used herein include those having the structure (B)

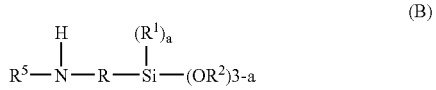

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—NH—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Representative curing agents which are mono-primary amines include those selected from γ-aminopropyltrimethoxysilane γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, δ-aminobutylmethyldiethoxysilane, δ-aminobutylethyldiethoxysilane, γ-aminoisobutylmethyldiethoxysilane, N-methyl-g-aminopropyltriethoxysilane, N-phenyl-γ-aminoisobutylmethyldiethoxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methylaminopropyltriethoxysilane, γ-aminopropylmethoxydiethoxysilane, or as depicted as 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, condensed aminoalkyl silanes such as bis(3-aminopropyl) tetramethoxy or tetraethoxy disiloxane $NH_2$ $(CH_2)_3$—Si $(OCH_3)_2$—O—$(CH_3 0)_2$ Si—$(CH_2)_3$ $NH_2$, polyglycol ether-modified aminosilanes such as that sold under the Trademark "Dynasylan 121" and triamino functional propyl trimethoxy silanes such as "Dynasylan TRIAMO" available from Huls AG.

The curing component must contain only one primary amine and at least one hydrolyzable group, preferably up to 4 hydrolyzable groups. In forming crosslinks between the fluoroelastomer cure sites, the silane couples to the fluoroelastomer in the absence of water by what is believed to be an initial ionic bond to the acidic cure-site, and extends from the fluoroelastomer via FK-O—$NH^+$—R—Si—OR, where FK is the fluoroelastomer at the acidic cure site, and R is any divalent hydrocarbyl moiety containing any of C, O, N and S moieties. Linking of adjacent Si—OR groups is believed to proceed by moisture-induced condensation.

There are myriad hydrocarbyl groups provided by the many known organosilanes representing the crosslink chain, and readily apparent from the several examples provided herein. The two co-reactive crosslinkable groups provide a total of at least 8 atoms bridging the fluoroelastomer, and preferably from 10-16 linking atoms between the crosslinked polymer cure sites. The preferred hydrocarbyl groups are $C_2$-$C_6$ substituted or unsubstituted alkylene groups. The preferred hydrolyzable groups bonded to each silicone atom couple to each other and are $C_1$-$C_4$ alkoxy groups.

The term "hydrolyzable group" means any group attached to the silicon which is hydrolyzed in the presence of moisture. The hydrolyzable silicone bonded groups include, halogen atoms such as F, Cl, Br or I; alkoxy groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, and hydrocarbyl ethers such as 2-methoxyethyl, 2-ethoxyisopropyl, 2-butoxyisobutyl, p-methoxyphenyl or —$(CH_2CH_2O)_2CH_3$; or any N,N-amino radical such as dimethylamino, diethylamino, ethylmethylamino, diphenylamino, or dicyclohexylamino. Not preferred are amino radicals X such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical and M' is any divalent hydrocarbon radical both valences of which are attached to the carbon, such as hexylene, pentylene or octylene; ureido groups of the formula —N(M)CONM"$_2$ in which M is a hydrocarbon or halohydrocarbon radical and M" is H or any of the M radicals; carboxyl groups of the formula—OOCMM" in which M and M" are defined above or halogenated hydrocarbon radical, or carboxylic amide radicals of the formula —NMC=O(M") in which M and M" are defined above. X can also be the sulfate group or sulfate ester groups of the formula —$OSO_2$(OM) where M is defined above hydrocarbon or halogenated hydrocarbon radical; the cyano group; the isocyanate group; and the phosphate group or phosphate ester groups of the formula—OPO(OM)$_2$ in which M is defined as above.

The natural color of the preferred fluoroelastomer coatings of the present invention are clear in the absence of added pigments such as carbon black. Color and/or opacity can be obtained with known pigment grinds according to conventional coating formulation techniques. Particulate metal powders are useful for reflective properties. The term "particles" is inclusive of irregular shapes, granular shapes, leafy shapes or complex assorted shapes. Heat reflective pigments are commercially available in many forms, as fine-grain solids or as leafy-shaped flakes. These are available as dispersions or pastes in solvent, e.g., mineral spirit. Flakes derived from finely divided vapor deposited films are suitable. Metallic particles of a particle size average of 5 to 25 μm employed at a level of at 10 to 100 parts by weight per 100 parts by weight of fluoroelastomer when cast in a thin film of 5 mils (0.01 cm.) provide effective radiant energy emmissivity and yet provide sufficient flex-fatigue resistance in the coating so as to not undergo stress-cracking. Metal particles having an average particle size of 25 to 100 microns must be employed at a level of at least 20 parts and up to 150 weight parts per 100 parts by weight of fluoroelastomer to provide sufficient radiant heat emmissivity without stress cracking. Preferred aluminum particles are flakes of a size such that 99.9% pass through 325 mesh screen, i.e., a diameter of less than about 45 microns, most preferably from 8 and 35 and especially from 10 and 20 microns in average particle size.

For the purposes of the present invention, the term solvent can broadly be defined as a free-flowing liquid carrier capable of dissolving or maintaining the organic components in a substantially dispersed state, and preferably in solution. Preferred solvents include water based latexes and/or non-HAP (Hazardous Air Pollutant) or non-VOC, or non-HAP, non-VOC organic solvents.

Non-HAP solvents include methyl acetate, n-butyl acetate, t-butyl acetate, acetone, ethyl acetate, isopropyl acetate, isobutyl acetate, tetrahydrofuran, n-methylpyrrolidone, aliphatic hydrocarbons such as heptane, dimethylformamide, diisobutyl ketone (DIBK), methyl isoamyl ketone, monochlorotoluene, para-chlorobenzotrifluoride (PCBTF), and vm&p naphtha. A combination of acetone and DIBK is the preferred non-HAP solvent mixture. Acetone, methyl acetate, and para-chlorobenzotrifluoride (PCBTF) alone or in any combination are the preferred solvents for HAP, and VOC compliant coatings. Among the HAP solvents which are photochemically reactive in the atmosphere are hexane, xylene, toluene, MEK, and MIBK. Toluene, xylene, MEK and MIBK are the preferred solvents when HAP and VOC compliance is not critical.

On a weight percentage basis, the nonvolatiles are generally present at from about 3 to about 30% wt. percent with the remainder being solvent, and preferably from about 5 wt % to about 15 wt. % nonvolatiles.

up to 200% elongation without cracking or delaminating from the flexible elastomer substrate. The fluoroelastomer coatings, according to the invention, exhibit improved elongation of 200%, and preferably 300%+/−50%, and tensile strength of 600 psi or more, as tested according to ASTM-D412 on cured, unsupported coating films.

The following nonlimiting examples illustrate the comparative effects of certain technical requirements according to the invention.

EXAMPLES

To measure acid number an elastomer is dissolved in acetone or a 1:1 acetone/MIBK solution and then titrated with 0.01 N sodium hydroxide to a phenolphthalein endpoint. The examples below demonstrate that a fluorocarbon polymer with an acid number of about 1 (+/−0.02) mg base per gram of polymer does not cure using a mono-primary aminosilane or it cures poorly to give unacceptably low tensile strength and low elongation. Unacceptable tensile strength is below 600 p.s.i., and unacceptable elongation is below 200%. The Examples below illustrate that the minimum ratio of equivalents of primary mono amino silane to cure site acid equivalents is 3:1. As the equivalent ratio is increased up to 12:1, tensile strength improves without unacceptable loss of elongation. Above 12:1 equivalent ratio, strength drops and the clarity decreases.

| Example | 1 | 2 | 3 | 4 | 5 | 6 | 7 | 8 | 9 |
|---|---|---|---|---|---|---|---|---|---|
| Viton ® A-100 | 100 | 100 | 100 | — | — | — | — | — | — |
| Dai-el ® G902 | — | — | — | 100 | — | — | — | — | — |
| Dai-el ® G704BP | — | — | — | — | 100 | 100 | 100 | 100 | — |
| Technoflon ® N535 | — | — | — | — | — | — | — | — | 100 |
| APTES* | 4.0 | 8.0 | 10.0 | 10.0 | 3.0 | 6.0 | 10.0 | 15.0 | 10.0 |
| Tensile strength (psi) (DNC = did not cure) | DNC | DNC | DNC | DNC | DNC | 915 | 1495 | 1170 | 1480 |
| Elongation (%) | nm | nm | nm | nm | nm | 905 | 795 | 400 | 590 |
| Acid Value | 0.99 | 0.99 | 0.99 | 0.24 | 3.88 | 3.88 | 3.88 | 3.88 | 4.02 |
| Clarity | nm | nm | nm | nm | nm | clear | clear | cloudy | clear |

*3-aminopropyletriethoxysilane
Nm = not measurable

Coated Articles

A myriad of products comprising moldings made from elastomers such as HNBR, natural rubber, polyisoprene, polybutadiene, styrene butadiene and ethylene propylene rubber are coated according to the invention. Included are the elastomeric products which are designed to flex and bend, distort, and/or dampen forces including absorbing torque or repeated vibration, or the articles may bit be flexed in service, but are exposed to fuels, oils and the like during their service life as utilized in numerous industrial applications. Specific examples are hoses, seals, gaskets, mounts, such as engine mounts, dampers and insulating devices, to name a few. As molded parts, like rubber hoses, boot coverings, housings, belts, various mounts, shrouds, seals, grommets, washers, gaskets, spacers, covers, mabde from more general purpose rubbers or thermoplastic elastomers or of the thermosetting (vulcanized) rubber materials. Adhesion of the coatings to these substrates is essential as well as obtaining cured physical properties, e.g. toughness and elongation. The coatings, on pneumatic tires must be capable of 100% elongation, and exhibit no distortion. Preferably the coatings recover completely when extended Primer Coating Examples.

In experiments to test coating adhesion to natural rubber, a primer consisting of a solvent, and carboxylated elastomers, e.g., carboxylated isoprene resin, carboxylated NBR and carboxylated polyethylene were formulated according to the teachings in copending application Ser. No. 10,205,178, incorporated herein by reference as if entirely contained herein. The formulations in solvent contained from 25-150 phr of a primary monoaminoalkoxysilane or blend of primary monoaminoalkoxysilanes. Coatings applied and allowed to stand overnight exhibited good adhesion to natural rubber. It was observed that neither the aminosilane nor the carboxylated resins were individually effective in bonding to natural rubber. Non-amino silanes were evaluated and found to be ineffective as was a maleic anhydride adducted polybutadiene.

The priming of rubber substrates successfully replaced the conventional pretreatments using Chemlok® 7701 or 7707.

Surprisingly when the above primers were applied to nonpolar elastomer substrates, the fluoroelastomer coatings according to the present invention exhibited outstanding adhesion and flex resistance. The fluoroelastomer coating improved the fuel and solvent resistance of the molded natural rubber parts.

What is claimed is:

1. An ambient temperature curable coating composition in a mixture of 2-parts providing a non-volatiles content of from 4% to 25% by weight, and comprising a part A which comprises an organic solvent and fluoroelastomer dissolved therein, said fluoroelastomer containing crosslinkable sites in quantitative amount according to an acid number of from 2 to 6 mg base per gram, and a part (B) which comprises an organosilane comprising hydrolyzable groups and a mono primary amine, wherein the ratio of amine equivalents in part B to acid equivalents in part said A ranges from 3:1 to 12:1 and wherein a cured unsupported film from said coating exhibits at least 200% elongation.

2. The coating of claim 1 wherein said fluoroelastomer has an acid number of from 3 to 5 mg base per gram.

3. The coating of claim 1 wherein said film forming polymer is a hydrogenated random or block diene copolymer having a molecular weight of about 20,000 to 200,000.

4. The coating of claim 1 wherein said acid equivalents are from functional groups selected from a sulfonic acid, a sulfenate, a sulfinate, chlorosulfonic acid, a carboxylic acid, a dicarboxylic acid, a partial ester of a carboxylic anhydride, and cyclic imides of dicarboxylic acids.

5. The coating of claim 1 wherein said acid equivalents are provided from an α,β-unsaturated carboxylic acid.

6. A coating wherein said curing is selected from the group consisting of aminopropyltriethoxy, aminopropyl trimethoxy silane, aminoethylaminopropyltriethoxy, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl) tetramethoxy and bis(3-aminopropyl) tetraethoxy disiloxane.

7. A multi-layer coating on a flexible elastomer, comprising a primer layer and a top coating, wherein the primer layer comprises a film former having a Tg of less than 0° C. which is cured with from 25 to 150 phr of an organosilane, and wherein said top coating comprised the fluoroelastomer coating according to claim 1.

8. A multi-layer coating according to claim 7 wherein the primer coating comprises a polymer selected from the group consisting of carboxylated polyisoprene, carboxylated NBR, and carboxylated polyolefin.

9. A coated article having first and second surfaces, adhered to said first surface is a cured coating comprising a film of carboxylated NBR, carboxylated isoprene, or carboxylated ethylene copolymer, cured with from 25 to 150 phr of an organosilane, and on said second side is adhered a cured coating comprising the fluoroelastomer coating composition according to claim 1.

10. A coated article according to claim 9 selected from a seal, gasket, and a mount.

11. A coated article comprising as a substrate a molded article made from an elastomer selected from the group consisting of HNBR, natural rubber, polyisoprene, polybutadiene, styrene-butadiene, and ethylene-propylene rubber and the coating composition of claim 1 adhered thereto.

* * * * *